F. W. PETERSON.
SPEED REGULATING PULLEY.
APPLICATION FILED MAY 27, 1911.
1,050,289.
Patented Jan. 14, 1913.
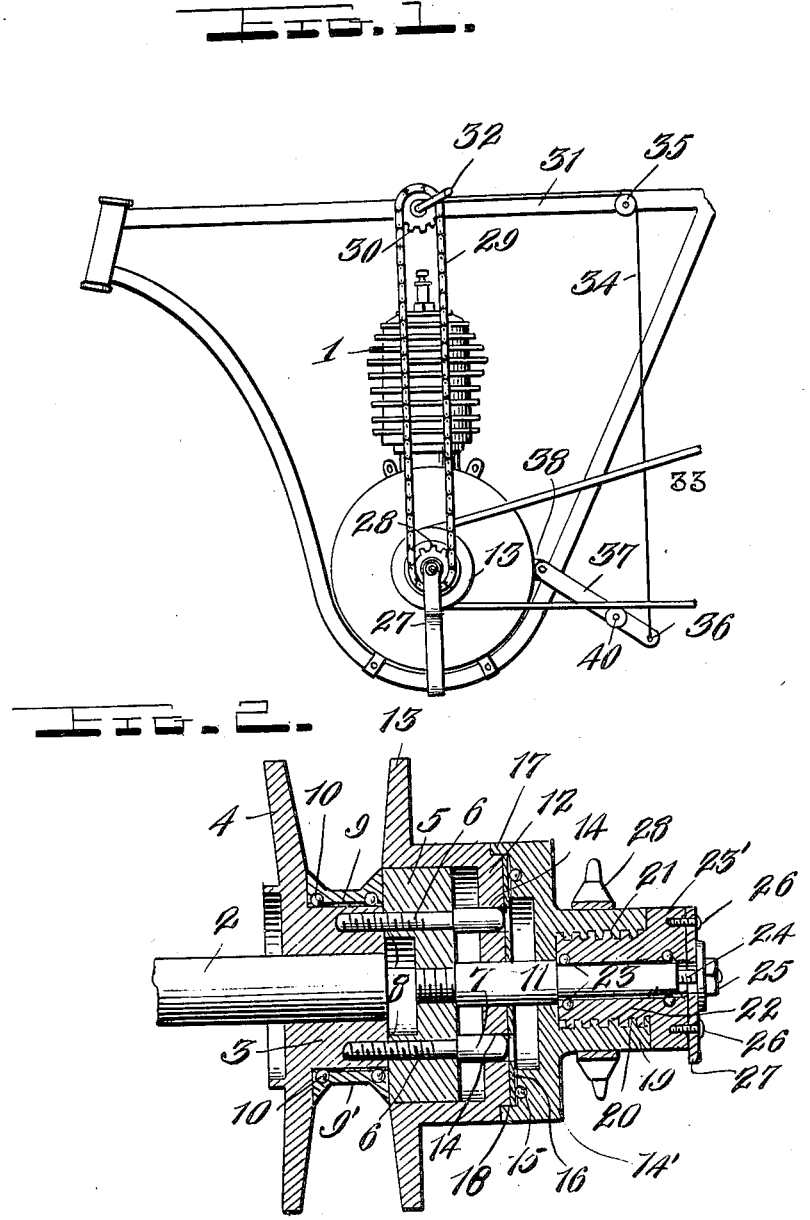
Witnesses
Chas. L. Griesbauer.
H. E. Coleman.
Inventor
F. W. Peterson,
By Watson E. Coleman,
Attorney

UNITED STATES PATENT OFFICE.

FREDERICK W. PETERSON, OF OAKLAND, CALIFORNIA.

SPEED-REGULATING PULLEY.

1,050,289.  Specification of Letters Patent. Patented Jan. 14, 1913.

Application filed May 27, 1911. Serial No. 629,761.

*To all whom it may concern:*

Be it known that I, FREDERICK W. PETERSON, a citizen of the United States, residing at Oakland, in the county of Alameda and State of California, have invented certain new and useful Improvements in Speed-Regulating Pulleys, of which the following is a specification, reference being had to the accompanying drawings.

This invention relates to speed regulating pulleys and more particularly to that class used on motor cycles for regulating the speed thereof, and the invention consists of an improved speed regulating pulley in connection with which the driving belt operates, said pulley being mounted on and used in connection with the crank shaft of the motor.

A further object of the invention is to provide a pulley of this character which will possess advantages in points of efficiency, durability, is inexpensive of manufacture and at the same time being simple in construction and operation.

With the foregoing and other objects in view the invention consists in the novel features of construction and the combination and arrangement of parts hereinafter described, pointed out in the claims and shown in the accompanying drawings, in which—

Figure 1 is a side elevation showing my improved speed regulating pulley in connection with a motor and showing also a part of the frame of a motor cycle and the method of using the device; and Fig. 2 is a transverse sectional view of the pulley.

Referring more particularly to the drawing 1 indicates the motor of an ordinary motor cycle, and 2 indicates the crank shaft of said motor. The connection between the crank shaft and motor is not shown, but it will be understood that said crank shaft is connected with the motor in the usual manner. Mounted upon the crank shaft 2 is a hub 3 provided with a flange 4 constituting one side of the pulley. A disk 5 is secured to the hub 3 by means of the screw bolts 6, said bolts being provided with an enlarged end 7 adapted to fit tightly up against the disk holding the latter rigidly up against the hub. The disk 5 is provided with the recess 8 adapted to receive the inner end of the shaft 2, and the outer edge of the disk is disposed beyond the periphery of the hub 3 forming a guide for the belt pulley 9 disposed between the flange 4 and the outer edge of the disk 5. The belt pulley 9 is provided with the ball bearings 10, the pulley 9 running free on the hub so that there will be no motion conveyed to the cycle.

A centrally arranged shaft 11 is provided having its inner end threaded into the disk 5 at a central point. Slidably mounted on the shaft 11 is a tubular hub 12 having the flange 13 formed integral therewith, said hub being adapted to receive the disk 5 secured to the hub 3. The enlarged heads 7 of the bolts 6 are adapted to be disposed in the openings 14 formed in the hub 12 at its closed end, said bolts being adapted to hold the flange 13 in place against angular movement.

A regulating disk 14' is slidably mounted on the shaft 11 and provided with the ball bearings 15 adapted to roll against a sheet metal plate 16 disposed between the closed end of the hub 12 and the disk 14', said disk being provided with an annular flange 17 adapted to be disposed in a notch 18 in the hub and acting as a guide for the disk 14'. Formed integral with the disk 14' is a sleeve 19, which is interiorly threaded as shown at 20, the threads 20 being adapted to engage with the threads 21 formed on the sleeve 22 which is mounted on the shaft 11 and provided with the ball bearings 23 so that the shaft 11 will rotate within the sleeve. The sleeve 22 is provided with an outer flange 23' to hold the sleeve 19 in place.

The outer end of the shaft 11 is screw threaded as shown at 24 and a nut 25 threaded thereon. Secured to the flange 23' by means of the screws 26 is a brace 27 having its other end secured to the frame of the motor cycle in any desired manner.

Mounted on the sleeve 19 is a sprocket 28, which is operated by the chain 29, said chain being operated by means of a sprocket 30 mounted on the horizontal member 31 of the cycle frame. The sprocket 30 is operated by means of a small hand crank 32, which through the medium of the sprocket 30 and the chain 29 operates the sprocket 28 turning the sleeve 19 on the threaded sleeve 22, forcing the disk 14' against the hub 12 which in turn will frictionally engage the V-shaped belt 33 forcing the same outwardly between the flanges 13 and 4 transmitting motion from the crank shaft.

The pulley 9 is provided with a V-shaped recess 9' to receive the belt 33 and it will be seen that the pulley 9 will run freely on the hub 3 thus allowing the engine to continue running and still be free from the motor cycle. The object of this pulley is to permit the V-shaped belt to remain stationary on the pulley 9 when it is not desired to communicate motion to the motor cycle.

Secured to the shaft on which the sprocket 30 is mounted, and adapted to wind on said shaft is a cord 34 which is passed around a pulley 35 and downwardly, and connected at 36 with an arm 37 pivoted to the casing 38 and provided with a roller 40 which bears on the lower side of the bottom reach of the driving belt 33.

With this construction it will be seen that the turning of the sprocket 30 will result in the forcing of the flange 13 toward the flange 4 and frictionally engaging the belt 33 between the two flanges causing the same to ride upward in the V-shaped space between the opposing faces of the flanges, and imparting motion to the motor cycle. As the flange 13 is moved toward the flange 4 it will thus increase the effective diameter of the pulley and will tend to increase the speed of the motor cycle. The cycle is stopped by sliding the disk 14' back in its normal position, when the belt will force the flange 13 back from the flange 4 and drop down on pulley 9, allowing the engine to run free and the belt and cycle will remain stationary. The operation of rotating the sprocket also results in regulating the tension of the driving belt 33, this operation being accomplished by the cord 34 and the arm 37, the roller 40 of which operates in connection with the under side of the bottom reach of said belt.

It will be understood that the flanges 13 and 4 form a pulley, the diameter of which is increased or decreased by the operation of the apparatus as herein described and this operation may be effected while the motor is in operation, and a continuous progressive speed ratio without jerks or jars may thus be obtained regardless of the speed of the motor.

While I have shown and described the preferred construction of my invention it will be obvious that various changes in the details of construction and in the proportions may be resorted to for successfully carrying the invention into practice without sacrificing any of the novel features or departing from the scope thereof.

Having thus described my invention I claim:

1. In a device of the character described, the combination of a drive shaft, a hub fixed thereon provided with a flange, a disk detachably secured to said hub, a second hub provided with a recess for receiving said disk, bolts extending from said disk and operating within openings formed in the rear wall of the second hub, said second hub being provided with a flange which is arranged opposite the first mentioned flange, a shaft extending from said disk, a pressure disk slidably mounted upon said shaft and provided with a flange, an interiorly threaded sleeve formed integral with said pressure disk, the flange of said pressure disk being adapted to operate within an annular groove formed in the second mentioned hub, a threaded sleeve mounted upon said shaft and adapted to engage the interiorly threaded sleeve and means for rotating said pressure disk whereby the second hub will move toward the first mentioned hub substantially as described.

2. In a device of the character described the combination with a speed regulating pulley, a sprocket wheel mounted thereon, a crank shaft, a sprocket wheel on said shaft, a sprocket chain connecting said sprockets, a frame, a lever pivotally mounted upon said frame, a roller mounted upon said lever, a flexible member connecting said lever with said crank shaft, a belt extending over said pulley, said roller adapted to engage said belt whereby rotating the said crank shaft the speed regulating pulley and lever will be operated simultaneously substantially as described.

In testimony whereof I hereunto affix my signature in the presence of two witnesses.

FREDERICK W. PETERSON

Witnesses:
FRANKLIN HOWES,
HOWARD J. PEIRSOL.